United States Patent [19]

Lewis, Jr. et al.

[11] 4,256,089
[45] Mar. 17, 1981

[54] DRAIN DOWN FREEZE PREVENTION CONTROL SYSTEM FOR A SOLAR COLLECTOR

[76] Inventors: Raymond H. Lewis, Jr., 3114 Tuxedo Ave., West Palm Beach, Fla. 33405; James B. Carr, 4897 Andros Dr., West Palm Beach, Fla. 33407

[21] Appl. No.: 875,371
[22] Filed: Feb. 6, 1978
[51] Int. Cl.³ .............................................. F24J 3/02
[52] U.S. Cl. ................................... 126/420; 126/422
[58] Field of Search ............... 126/270, 271, 420, 422; 137/58, 59, 60; 237/80

[56] References Cited

U.S. PATENT DOCUMENTS

| | | | |
|---|---|---|---|
| 3,346,191 | 10/1967 | Hapgood | 126/271 |
| 3,799,145 | 3/1974 | Butterfield | 126/271 |
| 4,027,821 | 6/1977 | Hayes | 126/422 |
| 4,052,000 | 10/1977 | Honikman | 126/271 |
| 4,063,545 | 10/1977 | Roach | 137/59 |
| 4,064,868 | 12/1977 | Nussbaum | 126/420 |
| 4,129,118 | 12/1978 | Banke | 126/422 |
| 4,133,338 | 1/1979 | Honikman | 126/271 |

FOREIGN PATENT DOCUMENTS 1137405 12/1968 United Kingdom ................ 137/61

Primary Examiner—Samuel Scott
Assistant Examiner—Gerald Anderson
Attorney, Agent, or Firm—Malin & Haley Haley

[57] ABSTRACT

A control device for preventing freeze damage to a solar hot water heater collector and auxiliary conduits, while insuring system operation for absorbing energy whenever sufficient useable solar energy is available, thereby increasing the overall efficiency of the system. The control device includes a drain valve that may be opened as a function of ambient temperature and a drain down override circuit that insures closure of the drain down system whenever a predetermined temperature differential exists between the water in the collector and the heated water in the storage tank. The drain down will be thereby overridden in favor of increasing system energy at a predetermined temperature differential.

4 Claims, 4 Drawing Figures

DRAIN DOWN FREEZE PREVENTION CONTROL SYSTEM FOR A SOLAR COLLECTOR

BACKGROUND OF THE INVENTION

This invention relates generally to a freeze protection control device utilized in a solar hot water heating system having a collector and associated conduits that are exposed to potential freezing temperatures. Specifically, the system includes and utilizes both ambient and collector panel temperature sensors which monitor for freezing temperatures and collector and tank temperature sensors which provide a differential that establishes useable available solar energy. The system includes an override circuit that prevents drain down even when ambient temperatures are well below freezing if sufficient useable solar energy is available to allow additional energy to be gained by the system.

In many present day systems using solar energy absorption collectors, it is common to heat water, either potable or nonpotable and as heated, transfer the water to a hot water storage tank inside a building or dwelling or the like. The collector and associated conduits are necessarily exposed outdoors. One of the problems in using such a system is that whenever solar energy is not available, the temperature of the fluid medium such as water in the collector and conduits which are exposed outdoors, will often times in northern climates drop below freezing, causing damage to the system. One solution to prevent collector freeze up in the past has been to provide a temperature sensor in the collector so that whenever the collector temperature approaches freezing, drain down of the collector is actuated. One of the problems, however, is that by the time the collector temperature approaches freezing, other components, conduits, or accessories such as a vacuum breaker or drain conduit had already frozen which would then prevent drain down of the collector, resulting in a freeze up of the collector. Thus, sensing collector temperature alone is not adequate to prevent freeze up. However, if ambient temperature alone is utilized to drain the system, there will be a large loss of useable available energy in that often times solar energy is available even though ambient temperatures are well below freezing. On a cold, sunny winter day in a northern climate, a solar collector can work quite efficiently to heat water for the storage tank in spite of the fact that the outside air temperature is below freezing. Utilization of an ambient sensor alone would not allow capturing of this available solar energy and, more importantly, would not protect the collector panels from the phenomenon of "night sky radiation" whereby on clear nights the temperature of a solar collector may drop as much as 20 degrees F. below ambient temperatures. Other present day systems often use heated water from the storage tank to prevent freeze up, thereby wasting energy already gained.

The present invention overcomes the deficiencies found in the prior art freeze protection systems by providing for ambient temperature sensing which controls the drain down valve but which includes a drain down override circuit which prevents drain down based on a predetermined differential temperature between the collector and the storage tank which indicates that solar energy is available to allow the system to continue in operation regardless of ambient temperature. The invention also allows simultaneous monitoring of collector and ambient temperatures, thus also protecting the panels from freezing due to "night sky radiation".

BRIEF DESCRIPTION OF THE INVENTION

A freeze prevention, drain down control system for use in a solar hot water heater collector that provides for collector and associated component drainage under certain conditions whenever ambient or collector panel temperatures approach freezing. An override control circuit prevents system drain down whenever useable solar energy is present which is determined by the temperature differential between the collector and the storage tank. The control device includes an ambient temperature sensing means and a collector panel temperature sensing means which are connected to a drain valve control circuit, a collector temperature sensing means which determines the temperature of water in the collector and a storage tank temperature sensing means. The control circuitry provides for a differential temperature signal between collector and storage tank temperatures which is used to actuate a circulating pump which provides for flow of the water between the collector and the storage tank. The control circuit also includes an override circuit which whenever the circulating pump is in operation (which shows that useable energy is available and is being gained by the system), the drain will be prevented from opening regardless of the ambient temperature.

In one embodiment, the freeze prevention control device is utilizable with a variable flow proportional control circulating system which is described in pending U.S. Pat. application Ser. No. 731,520 filed Oct. 12, 1976 by Raymond H. Lewis, Jr. which provides for a continuously variable flow of the fluid medium between the collector and the storage tank as a function of useable solar energy as determined by the temperature differential between the collector and storage tank.

The drain down control system utilizes power to the drain valve solenoids to keep them closed such that should the system experience a power failure, the solenoids and valves will open, which results in drain down of the entire system.

The following are examples of the operation of the system under various types of ambient conditions.

Example No. 1:
The system is filled and it is a cold, cloudy day. There is some solar input such that the collector panel medium is held well above freezing but there is not enough solar energy gained to cause the control to initiate circulation of the medium into the storage tank. As the outside ambient temperature approaches freezing, it is sensed by the ambient temperature sensor which, because no energy is being gained by the system, shuts off power to the drain valves causing the drain valves to open, draining the entire system.

Example No. 2:
Ambient temperature is below freezing and at the end of the day's operation, a point is reached when the system stops circulating since no further energy is being gained. The override circuitry turns priority to the freeze protection which, again, because the ambient temperature is below freezing, causes the drains to open. Minimal time lag is experienced preventing possible piping or vacuum breaker freeze-up.

Example No. 3:
In early morning operation, with the ambient temperature below freezing (system drained), on a bright sunny morning the collector panel will be heated to a predetermined temperature differential (when the temperture of the collector is sufficiently greater than the temperature in the storage tank). In this situation, priority through the drain override circuit is again given to energy gain, which allows the system to refill and begins circulation between the collector and the storage tank.

It is an object of this invention to provide a freeze protection control circuit which utilizes both ambient temperature sensing and energy gain information to insure maximum efficiency of solar energy collection, while yet providing maximum possible protection against freezing of the collector panel and other exposed equipment.

It is another object of this invention to provide a control logic sequence for the operation of a solar hot water heater which determines priorities between system drain-down or receipt of available solar energy in order to most efficiently operate the solar collection system.

But yet, still another object of this invention is to provide a solar hot water heating system with freeze protection and an override circuit that determines whether the system is gaining energy or whether available energy can be gained which acts to prevent system drain-down even though the ambient temperature may be below freezing.

But yet, still another object of this invention is to provide a control device for a solar hot water heating system which monitors ambient and collector panel temperatures and monitors the temperature differential between the collector and the storage tank, with the control device providing for drain-down of the system when the ambient or collector panel temperature approaches freezing, with an override circuit that allows the system to continue to operate below ambient freezing temperatures whenever a predetermined amount of useable solar energy is available as indicated by an increase in the temperature of the solar collector over that of the storage facility.

In essence, the crux of the operation of the control system is that, given particular ambient conditions, the system is capable of transferring energy gained to the storage tank as a priority while still insuring complete freeze protection in a realistic time frame that will not allow premature freezeup of associated collector components which may damage said components and which would ultimately prevent drain-down, if necessary.

In one embodiment of the invention, the control circuit includes the use of a logic thyristor (triac) which, when conductive, in conjunction with ambient temperature or collector temperature sensing switching, will cause power to be removed from the drain solenoids causing the system to drain. However, with the circulating pump actuated, the drain-down logic triac switch is overridden, insuring full power to the drain solenoids.

PREFERRED EMBODIMENT OF THE INVENTION

Figure 1:
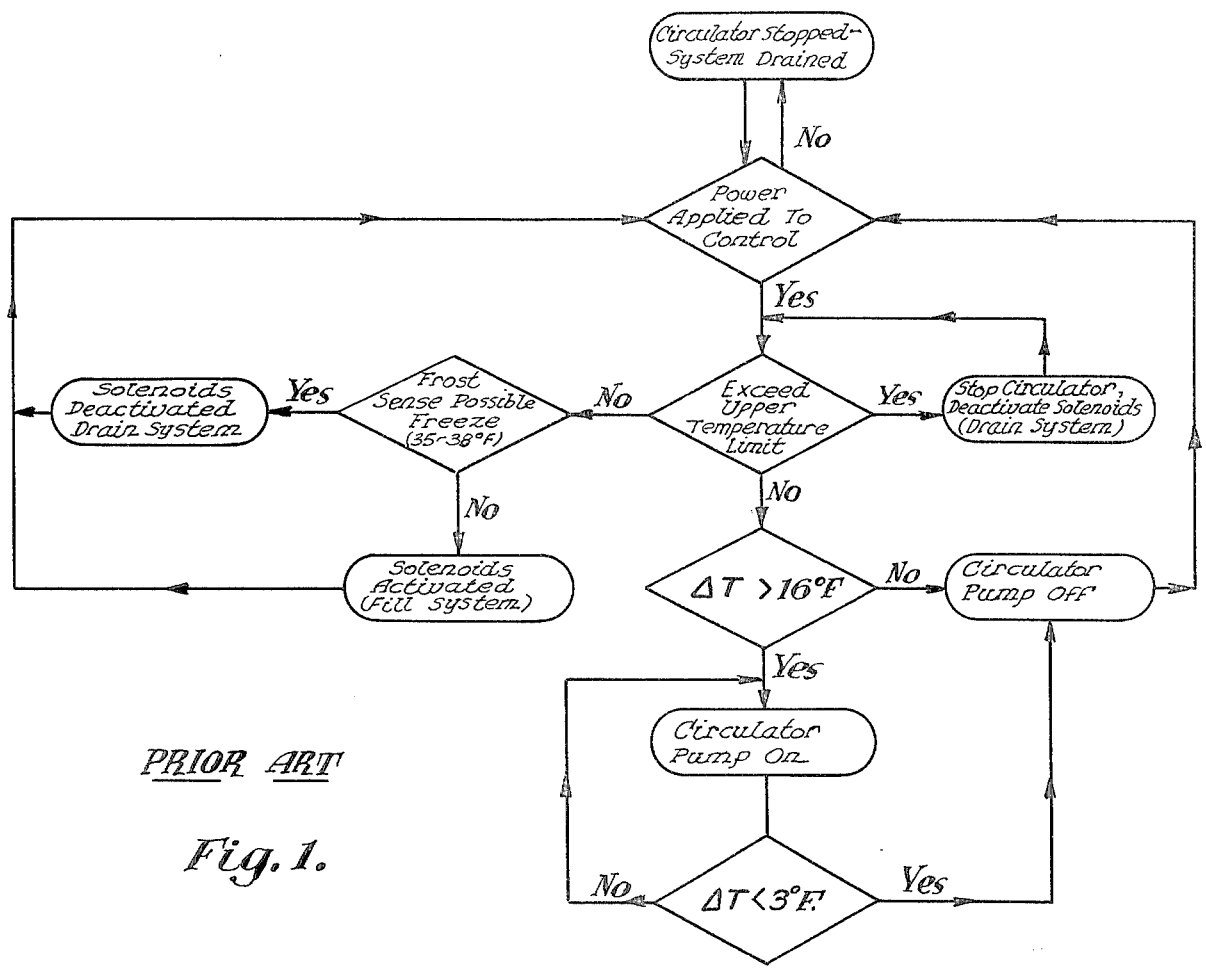
FIG. 1 shows a logic diagram of a typical prior art system having a drain-down type freeze protection.

Referring now to the drawings, FIG. 1 shows a typical prior art drain-down type freeze protection control logic diagram. In the system represented in FIG. 1, whenever the temperature of the water approaches freezing, which is usually sensed within the collector, a solenoid is deactivated which opens the drain valves, draining the system. Sensing collector panel temperature alone neglects the possibility of external equipment freezing which may occur if collector panels are warmed to temperatures well above ambient yet not high enough to initiate circulation. An alternative to this is to monitor simultaneously both collector and ambient temperatures. Using the prior art logic, however, whenever the ambient temperature approaches freezing, any available energy gain that could be achieved is lost in this system.

Figure 2:
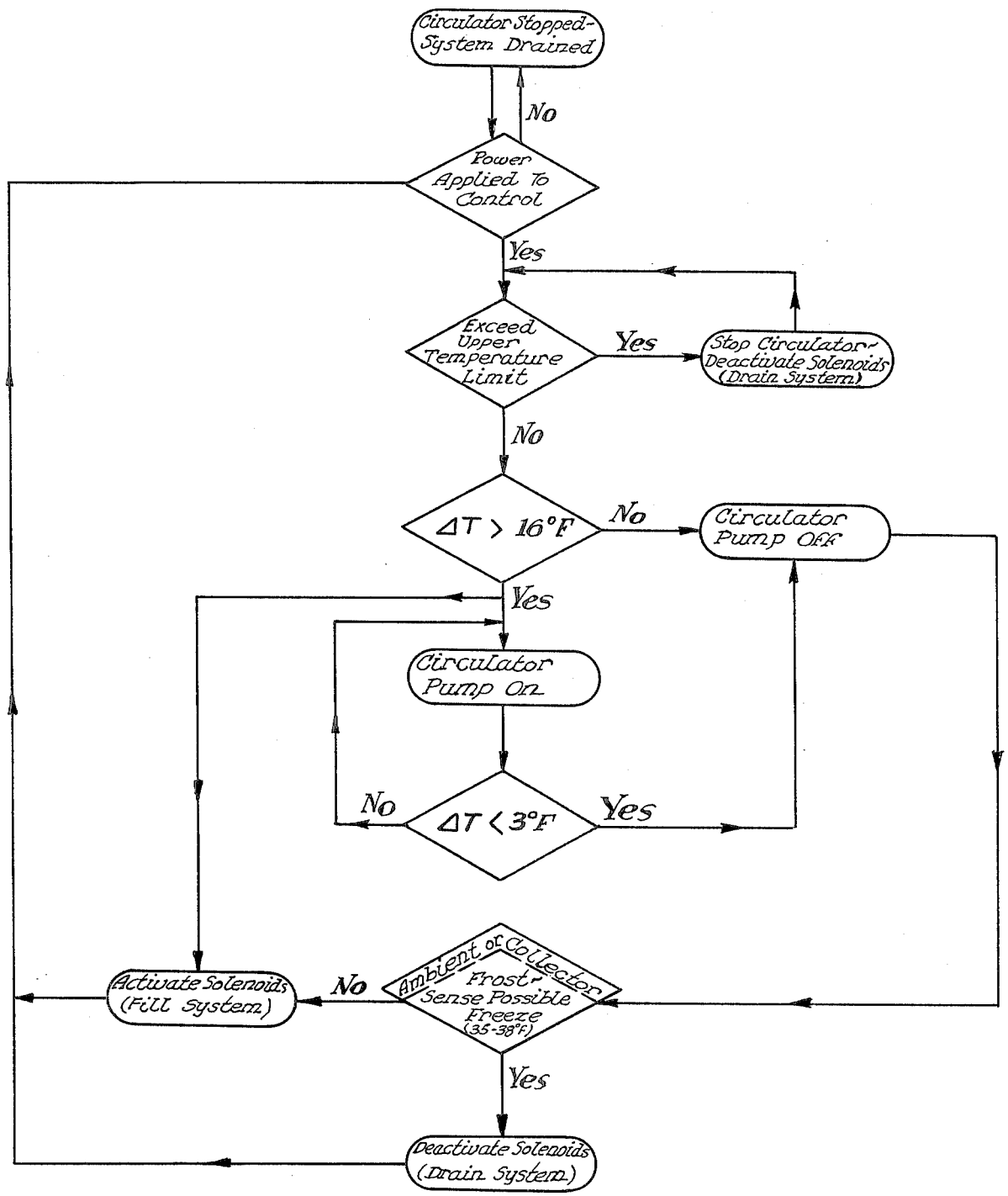
FIG. 2 shows a logic diagram utilized with the instant invention for freeze control protection.

FIG. 2 shows the logic operational diagram of the instant invention. In the logic hierarchy, a temperature differential between collector and storage tank (shown as 16 degrees Fahrenheit) will turn the circulating pump on, causing the system to fill and circulate regardless of the ambient temperature because the temperature differential circuitry takes priority over the ambient temperature monitor. If the temperature differential is not greater than the predetermined limit, the circulator pump will be turned off and, if the ambient temperature is near to or less than freezing, the drain valves will be opened. The system is failsafe in that even when the circulating pump is off, in normal operation, power continues to be applied to the drain solenoids keeping them closed. In the event of a power failure, there is no danger of ambient or collector freezing temperatures causing destruction to the system since power failure results in the deactivation of the solenoids, opening the drains. As noted from the logic diagram of FIG. 2, a temperature differential between collector and tank takes priority in activating the system when it is of sufficient magnitude so that there will be an energy gain in the system regardless of the ambient temperature. However, should there not be sufficient temperature differential, meaning that the system could not gain energy, the ambient freezing temperature sensor causes the system to drain, as ambient approaches or becomes less than freezing.

Figure 3:
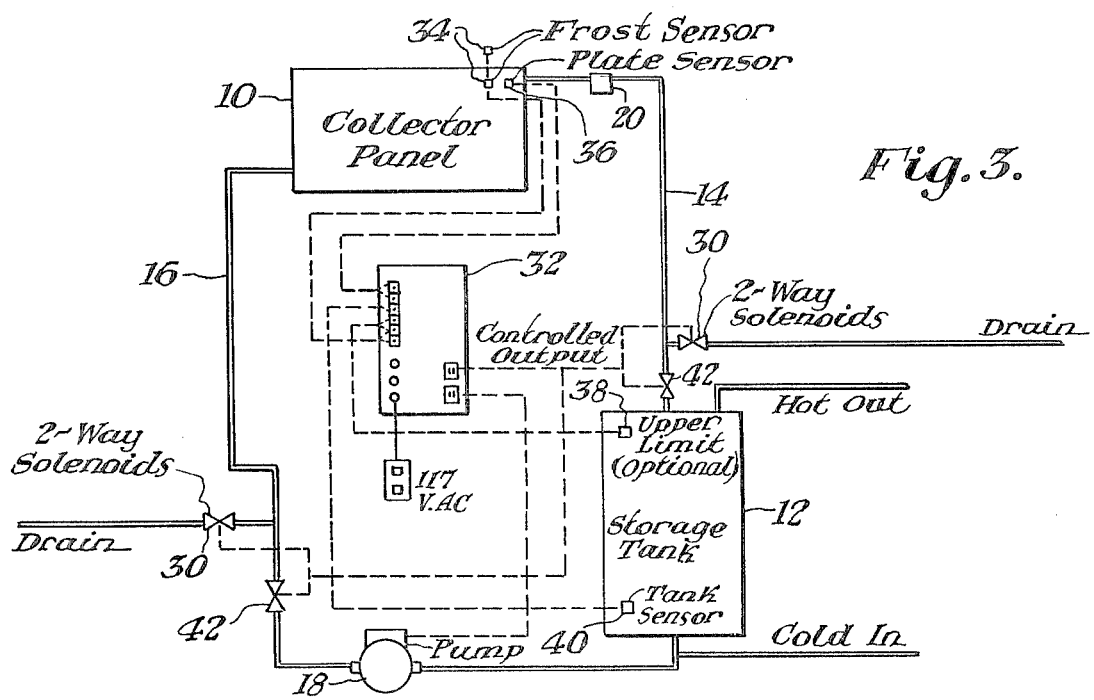
FIG. 3 shows a schematic diagram of a typical system utilizing the instant invention.

Referring now to FIG. 3, the instant invention is shown installed in a conventional direct solar energy collector. The collector panel 10 is connected to a storage tank 12 by inlet conduit 14 having a vacuum breaker 20 return conduit 16 which includes a pump 18.

Coupled to the collector panel 10 are ambient air temperature and collector panel temperature sensors 34 which are connected in series into a control panel 32. The collector panel also includes an additional temperature sensor or plate sensor 36 which is connected into the control panel 32. A tank temperature sensor 40 which senses the temperature of the water in the tank 12 is also connected to the control panel 32. An upper temperature limit sensor 38 reacts to a predetermined upper temperature limit within the tank which can effectively shut down and drain the entire system, overriding all other circuitry (which is explained below). The control panel 32 is likewsie connected to the circulating pump 18 which is used to variably control the volume of flow as a function of temperature differential between the collector panel and storage tank and which is controlled by control panel 32 to effectively turn the pump on or off or vary the flow rate of the pump. The two-way solenoids and valves 30 drain-down the system when open. Valves 42 are utilized to isolate the drain system from inlet water pressure. A single collector temperature sensor could be utilized for both collection panel freeze sensing and collector differential input.

Figure 4:
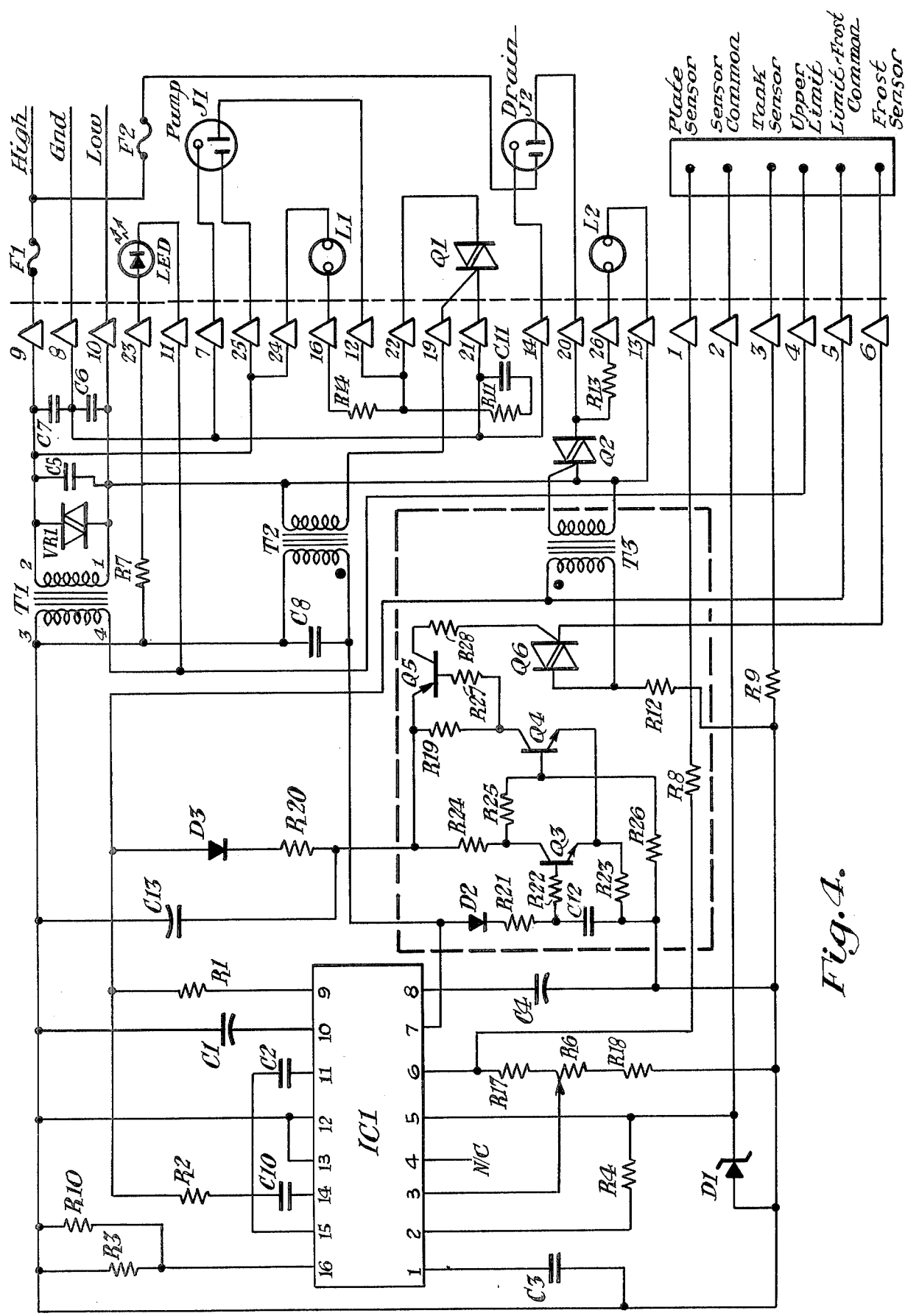
FIG. 4 shows a circuit diagram of one embodiment utilizing the instant invention.

Referring now to FIG. 4, the override circuit which is used to control the operation of the solenoids that open or close drains J2 and the associated control circuitry for the pump J1 is shown. Essentially, transformer T1 provides AC power to the upper limiting sensor terminal 4 (normally closed) to the limit terminal 5, limit common. Thus, with the upper limit sensor switch closed, power is received through terminal 5 to transformer T3. Transformer T3 provides a signal to triac Q2 (which when conducting) provides power to the solenoids of drain valves J2 holding the valves closed. The heart of the override circuit is based around the conduction or the nonconduction of logic triac Q6 which is coupled to the primary of transformer T3. The logic triac Q6 is coupled across terminal 6 which is the collector freeze sensor and ambient temperature sensor line. The limit common terminal 5 and terminal 6 are connected by a thermal switch when the temperature of the ambient air or collector panel freeze sensor is near or less than freezing temperatures. If logic triac Q6 is conducting and the above conditions are met, then the primary of transformer T3 will be shorted out by Q6 causing the triac Q2 to nonconduct, shutting off power to the solenoids and drains J2, which opens the system for drain-down. Thus, whenever Q6 is conducting and terminals 5 and 6 are closed by the temperature of the ambient air or collector panel being near or less than freezing, the drain will open.

The conductivity of triac Q6 is a function of whether or not there is a signal generated on pin 7 of IC 1 which signal also is used to initiate operation of pump J1. Therefore, whenever pump J1 is in operation, a pulsing AC signal is provided by pin 7 which, by means of diode D2, resistors R21 and R22, and capacitor C12, then provides a DC level to transistor Q3 causing transistor Q3 to conduct. Whenever transistor Q3 conducts, transistor Q4 (which is connected to Q3 as a Schmitt trigger), transistor Q5 and logic triac Q6 become nonconducting. Thus, anytime pump J1 is operating (an AC signal generated at pin 7 on IC1), Q3 will be made to conduct and logic triac Q6 will then be nonconductive preventing interruption of power at transformer T3 through triac Q2 to drain valve J2, keeping it closed. Whenever an AC signal is not present at pin 7 on IC1, (i.e., transistor Q3 is nonconducting and pump J1 is not in operation), then a net DC level is supplied to transistor Q4 by means of diode D3, resistors R20, R24, and R25 and capacitor C13 which causes transistor Q4 to conduct. When transistor Q4 conducts, transistor Q5 is also made conductive as is the logic triac Q6.

In summary, whenever the pump J1 is off, (no signal generated at pin 7), then logic triac Q6 will be conductive. When ambient sensor temperature or collector panel sensor temperature switches terminals 5 and 6 together, transformer T3 will be shorted out, opening drains J2, causing drain down of the system. Note also that the upper limit of terminal 4, if opened, will cause the complete system to shut down. A power failure would also cause drain J2 to open since the drain is normally held closed with the power on. The plate sensor terminal 1, the sensor common terminal 2, the tank sensor terminal 3, upper limit terminal 4, limit freeze common terminal 5, and freeze sensor terminal 6 are all low voltage connections and are shown on the same control unit bar.

The frost or freeze override circuitry interacts with the differential thermostat control circuitry and because the triggering of the override is dependent upon the triac trigger output at pin 7 on IC 1, rather than any output from triac Q1, the effect will be accomplished with either on/off or proportional output from Q1.

Typical values of resistors R21 and R24 are 10K, R25 is 470 ohms, R19 is 10K, R27 is 680 ohms, R28 is 100 ohms, R12 is 1.0K, R23 is 1.0K and R26 is 3.9K. Transistors Q3 and Q4 are model 2N3904; Q5 is a 2N3906; and Q6 is a Q200E5 (TECCOR).

The operation of the variable flow circulating pump J1 by the differential signal from a comparison of collector temperature and tank temperature through IC1 is described in Applicant Raymond H. Lewis, Jr. pending application U.S. Ser. No. 731,520, filed Oct. 12, 1976. It may also be desirable to include a drain opening delay of a few minutes to prevent system drain caused by momentary cloud cover when the system is operating at or near minimum collector tank temperature differentials, at below freezing ambient temperatures.

The present invention may be utilized with an on/off circulatory pump system not having the variable flow feature.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. In a closed solar energy storage system utilizing a collector, storage tank and conduit return system, a freeze protection drain comprising:
   a collector drain;
   collector temperature sensing means;
   ambient temperature sensing means;
   a means for opening said drain at a predetermined value of said ambient temperature or collector temperature connected to said ambient temperature and collector temperature sensing means;
   a means for closing said drain;
   means for sensing the temperature difference between said collector and said storage tank connected to said means for closing said drain whenever said temperature differential reaches a predetermined value; and
   means connected to said means for closing said drains for overriding said means for opening said drains whenever said temperature differential is at a predetermined value.

2. A drain control system in a solar energy collecting and storage device which utilizes a fluid heat transfer medium such as water to prevent freeze damage to the device comprising:
   solar energy collector having a fluid medium receptacle therein;
   fluid storage tank;
   first fluid conduit coupling said collector receptacle to said storage tank;
   second fluid conduit coupling said storage tank to said collector receptacle, said first and second fluid conduits, said collector and storage tank forming a closed fluid bearing system;

ambient temperature sensing means;
collector temperature sensing means;
storage tank temperature sensing means;
means connected to said collector temperature sensing means and said tank temperature sensing means for providing a first signal representing the temperature difference between said collector and said storage tank;
a drain valve connected to said first and second conduits for draining the heat transfer fluid medium in said collector;
means for actuating said drain valve to an open or closed position;
means for circulating the heat transfer fluid medium within said closed system;
a means for actuating said circulating means connected to said first signal generating means responsive to a temperature differential between said collector temperature sensor and said tank temperature sensor for actuating said circulating means at a predetermined temperature differential;
a second signal generator means for actuating said valve drain to a closed position whenever said fluid circulating means is actuated;
and a third signal generating means for actuating said drain valve to an open position whenever said circulating means is not actuated and said ambient temperature or said collector temperature is at a predetermined value.

3. In a solar hot water heating system having drain down freeze protection, said system including a collector, a storage tank, a circulating pump, and fluid conduits connected to said collector and said storage tank and said pump forming a closed fluid circulating system between said collector and said storage tank, the improvement comprising:
an ambient temperature sensing means;
a collector temperature sensing means;
storage tank temperature sensing means;
means for draining said collector and said fluid conduit;
pump control means connected to said collector temperature sensing means and said tank temperature sensing means and said circulating pump for activating said pump whenever said collector temperature is greater than said storage tank temperature by a predetermined amount;
a control means connected to said draining means for activating said draining means, said control means connected to said ambient temperature sensing means and said collector temperature sensing means, said control means activating said draining means whenever said ambient temperature or said collector temperature reaches a predetermined value; and
a control override circuit means connected to said pump control and said drain control means for deactivating said drain control whenever said circulating pump is activated.

4. A device as in claim 3, wherein said control override means, includes:
a drain valve;
means for opening or closing said drain valve;
a power supply connected to said drain valve actuating means;
said power supply holding said drain valve in a closed position when power is applied to said drain actuating means;
means for receiving a signal indicative of said pump being in operation connected to said power supply;
and a means for removing said power supply to said drain actuating means whenever said ambient temperature or said collector temperature is below a predetermined value and said pump operating signal is absent.

* * * * *